United States Patent
Carver

(12) 
(10) Patent No.: US 10,070,713 B1
(45) Date of Patent: Sep. 11, 2018

(54) CLIP HOLDER FOR HOLDING A TAPE MEASURE AND OTHER TOOLS

(71) Applicant: 5 Seas Engineering & Trading LLC, Dittmer, MO (US)

(72) Inventor: John W. Carver, Dittmer, MO (US)

(73) Assignee: 5 Seas Engineering & Trading LLC, Dittmer, MO (US)

( * ) Notice: Subject to any disclaimer, the term of this patent is extended or adjusted under 35 U.S.C. 154(b) by 0 days.

(21) Appl. No.: 15/453,326

(22) Filed: Mar. 8, 2017

(51) Int. Cl.
*A45F 5/02* (2006.01)
*G01B 3/10* (2006.01)

(52) U.S. Cl.
CPC ............... *A45F 5/02* (2013.01); *A45F 5/021* (2013.01); *G01B 3/1071* (2013.01); *G01B 2003/1074* (2013.01)

(58) Field of Classification Search
CPC ......... A45F 5/02; A45F 5/021; G01B 3/1071; G01B 2003/1074
USPC ........................................ 224/269, 904, 907
See application file for complete search history.

(56) References Cited

U.S. PATENT DOCUMENTS

| | | | |
|---|---|---|---|
| 1,519,380 A | 12/1924 | Kochanski | |
| 3,894,667 A * | 7/1975 | Baldocchi | A45F 5/02 224/198 |
| 4,358,036 A * | 11/1982 | Maltais | A45F 5/02 224/163 |
| 4,619,020 A | 10/1986 | Lecher et al. | |
| 4,754,528 A | 7/1988 | Lyons et al. | |
| 4,757,927 A * | 7/1988 | Rutty | A45F 5/02 224/269 |
| 4,784,199 A * | 11/1988 | Wise | A45C 1/08 150/134 |
| 5,025,966 A * | 6/1991 | Potter | A45F 5/02 224/183 |
| 5,038,985 A | 8/1991 | Chapin | |
| 5,100,037 A * | 3/1992 | Kopyta | A45F 5/02 224/235 |
| 5,388,741 A * | 2/1995 | Hillinger | A45F 5/02 206/349 |
| 5,450,994 A * | 9/1995 | Malinowski | A45F 5/02 224/249 |
| 5,452,830 A * | 9/1995 | Hopkins | A45F 5/02 206/372 |
| 5,979,019 A * | 11/1999 | Johnson | A44B 11/001 224/269 |
| 6,131,779 A * | 10/2000 | Gendala | A45F 5/02 224/148.1 |

(Continued)

*Primary Examiner* — Brian D Nash
(74) *Attorney, Agent, or Firm* — Husch Blackwell LLP

(57) ABSTRACT

A clip holder for holding a tape measure and other tools having a spring type clip associated therewith including an inner leg portion, an outer leg portion, and a fold formed therebetween, the outer leg portion angling towards the inner leg portion when in its unclamped position, the inner leg portion including a pair of elongated guide members for guiding the spring type clip associated with a particular tool when inserted over the fold, and at least one projection member projecting towards the outer leg portion. The outer leg portion may include at least one opening for at least partially receiving the at least one projection member when the outer leg portion is in its unclamped position, and a flared flange for allowing a user to more easily grasp the clip holder for both inserting onto and removing the clip holder from a pocket or other garment portion.

18 Claims, 2 Drawing Sheets

(56) References Cited

U.S. PATENT DOCUMENTS

| | | | |
|---|---|---|---|
| D443,199 S | 6/2001 | Swanson | |
| 6,269,993 B1 | 8/2001 | Ebejer et al. | |
| 6,966,519 B2 * | 11/2005 | Salentine | A45F 5/004 |
| | | | 224/162 |
| 7,216,788 B2 | 5/2007 | Blechman | |
| 7,222,762 B2 | 5/2007 | Rees et al. | |
| 7,748,583 B1 * | 7/2010 | Woltman | A45D 20/12 |
| | | | 224/242 |
| 7,802,706 B1 * | 9/2010 | Selsor | A45F 5/02 |
| | | | 224/269 |
| 2003/0106917 A1 * | 6/2003 | Shetler | A45F 5/02 |
| | | | 224/197 |
| 2007/0180726 A1 | 8/2007 | Harrell | |
| 2011/0139837 A1 | 6/2011 | Davis | |
| 2012/0178547 A1 * | 7/2012 | Famulari | A45F 5/021 |
| | | | 473/282 |
| 2012/0260513 A1 | 10/2012 | Daugherty et al. | |

* cited by examiner

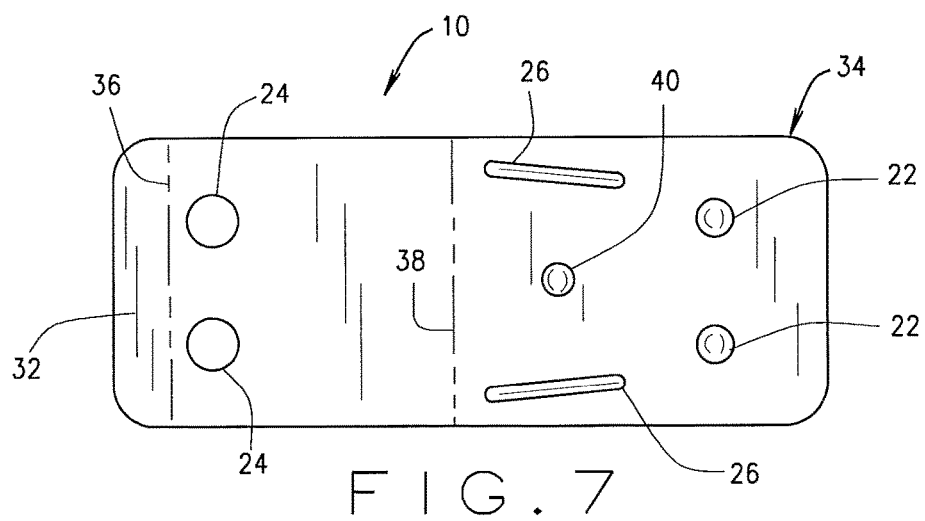
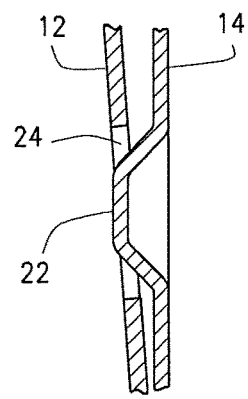
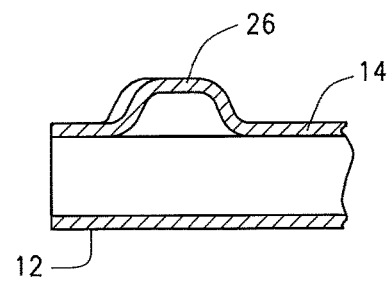
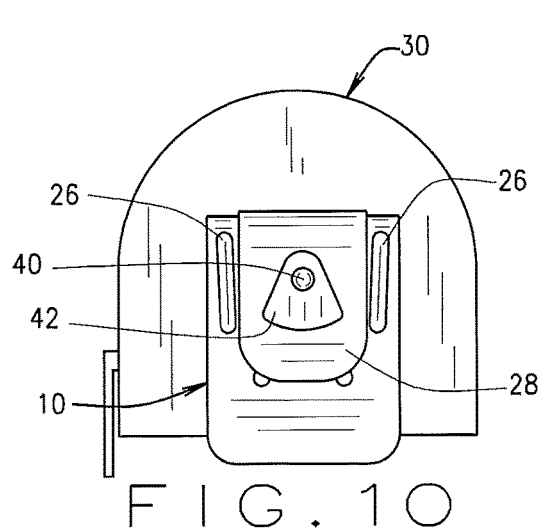
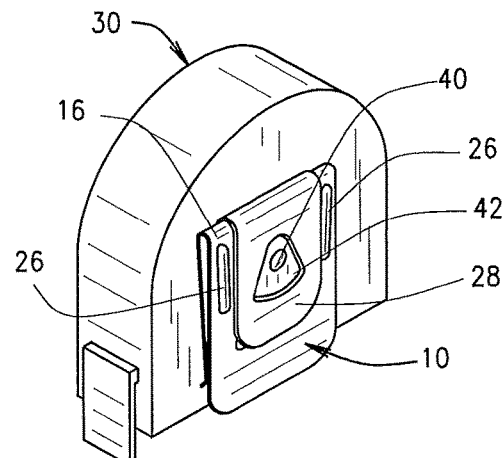

CLIP HOLDER FOR HOLDING A TAPE MEASURE AND OTHER TOOLS

BACKGROUND OF INVENTION

The present invention relates generally to a holding device for holding tape measures and the like and, more particularly, to a clip holder device adapted for engagement to a user's pocket, belt, waistband, utility belt pouch or other garment portion wherein the clip holder includes at least two dimples or projections for increasing its holding or gripping capability when attached to a garment portion, a pair of elongated ribs or guide projections for guiding a spring clip member commonly associated with a tape measure and other tools when slidably inserted onto the present clip holder, and a flared flange or tongue portion for easily grasping the present clip holder for attachment to and removal from a user's pocket, belt, pouch or other garment portion.

Carpenters, tradesmen, handymen, do-it-yourselfers and others typically carry a wide variety of different types of tools and accessories on their person that they frequently use and employ when working on a particular job or project. Many of these tools, such as tape measures, include a spring clip such that the tool can be easily carried in an easily accessible position on a user's belt, pocket, waistband or other garment portion. These spring clips make that particular tool easy to attach to a user's body and likewise make it readily removable for use. One problem commonly associated with the spring clips commonly provided on tape measures and the like is that the normal, routine movement of the user during his/her normal activities while on a particular job or project commonly causes the tool to become disengaged or dislodged from the user's body. Another problem is that the repeated attachment and removal of the spring clip from a user's garment tends to cause excessive wear and tear to the user's clothing or other garment portion to which the tape measure or other tool is attached.

Many different types of tool holding devices are well known in the industry for allowing tools such as a tape measure to be easily clipped to a tool holding device. For example, U.S. Pat. No. 4,619,020 discloses a tape measure clip holder for use on a belt or the like wherein the outer leg of the holding device includes a laterally extending slot which is configured to receive the tongue portion of a spring clip associated with the tape measure. The spring clip associated with the tape measure therefore engages the slot and is attached towards the lower portion of the holding device.

U.S. Patent Application Publication No. US 2007/0180726 discloses a tape measure holster system which includes a rectangular strip of durable material formed into a loop on its upper end for attachment to a user's belt, and its lower end is formed into a pocket so as to receive the clip member associated with the tape measure. Here again, the tape member is attached to the lower power of the holster system and the clip member is threaded through the pocket formed on the holder mechanism.

U.S. Pat. No. 7,216,788 likewise discloses a tool holder having a mechanism for attaching to the belt of a user and likewise includes a mounting plate which is offset a certain distance from the front surface of a guide plate and includes an aperture which provides an opening that allows a spring clip associated with a particular tool to be inserted between the offset so as to protrude through the opening at the bottom of the holder.

U.S. Patent Application Publication No. US 2011/0139837 discloses a pocket tape measure holder assembly which likewise includes a tool engaging member associated with one surface of the holder assembly which forms an opening or slot to likewise receive a clip associated with a conventional tape measure.

U.S. Patent Application Publication No. US 2012/0260513 includes a tape measure carrier which again includes a horizontal shelf that forms a support bridge for engaging the clip associated with a tape measure.

All of these holding mechanisms include additional mechanisms such as pockets, slots, brackets, pouches, compartments, and other members which form an opening or slot through which the spring clip of a tape measure or other tool can be inserted for securing the tape measure or other tool to the particular holding device.

It is therefore desirable to provide an improved clip holder for holding a tape measure or other tool that is relatively simple and inexpensive to manufacture, that includes improved griping means for securing the holding device to a pocket, belt, pouch, waistband, utility belt or other garment portion so as to avoid inadvertent disengagement of the holding mechanism from the user and so as to avoid other disadvantages associated with the above-referenced prior art devices, and which includes a guide mechanism for properly securing the spring clip associated with a tape measure or other tool to the clip holder.

SUMMARY OF INVENTION

The present invention relates to an improved clip holder device for holding a tape measure or other tool having a spring clip associated therewith. The present clip holder can be manufactured from a single blank piece of metal material which can be folded to form the present spring clip holder having first and second opposed leg portions for engaging a user's pocket, belt, waistband, pouch, utility belt, an appropriately sized webbing or other garment surface or portion so as to secure the present clip holder to the user. One of the opposed leg portions includes at least a pair of dimples or other projections which are positioned and designed so as to more firmly engage and grasp the user's pocket, belt, webbing or other garment portion so as to improve the gripping capability of the present device thereby more firmly securing the present clip holder to a user's garment. A corresponding number of openings or apertures are associated with the other opposed leg portion of the present clip holder device and are positioned and located so as to receive the dimples or projections associated therewith when the present clip holder device is engaged with a pocket, belt or other garment portion. The present openings allow the dimples or projections to force the fabric associated with the pocket, belt or other garment portion into the respective openings so as to firmly grip and secure the present clip holder device onto that portion of the garment to which it is attached. The spring nature of the present clip holder allows for such engagement when attached to a user.

In addition, one leg portion of the present clip holder device likewise includes a pair of elongated rib members or projections which are positioned adjacent the opposed side edges of that particular leg portion so as to guide the spring clip member associated with a tape measure therebetween when the tape measure spring clip member is engaged with the present clip holder device. The distance between the opposed elongated ribs or guiding projections associated with the present clip holder device can be varied and customized so as to guide different sized spring clips associated with a wide variety of different types of tape measures and other tools.

A flared flange or tongue portion can likewise be associated with one end portion of one of the opposed leg portions so as to allow a user to easily grasp the present clip holder device for attachment to and removal from a pocket, belt, pouch, webbing or other garment portion.

Other aspects and advantages of the present invention will be apparent to those skilled in the art from the following detailed description of the various embodiments and the accompanying drawings.

DESCRIPTION OF THE DRAWINGS

For a better understanding of the present invention, reference may be made to the accompanying drawings.

FIG. 7 is a top plan view of a single piece of material illustrating one method for forming the present clip holder.

FIG. 8 is a cross sectional view of one dimple or projection and its corresponding opening for receiving the same taken along line 8-8 of FIG. 3.

FIG. 9 is a cross sectional view of one elongated guide projection taken along line 9-9 of FIG. 4.

FIG. 10 is a rear elevational view of a conventional tape measure having its spring clip engaged with the present clip holder.

FIG. 11 is a perspective view of the tape measure of FIG. 10 engaged with the present clip holder.

DETAILED DESCRIPTION OF THE INVENTION

Figure 1:
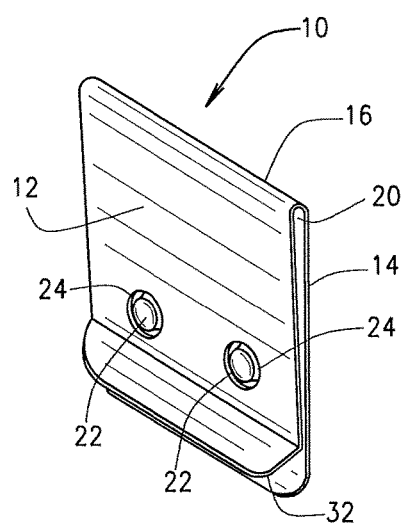
FIG. 1 is a perspective view of a clip holder constructed according to the teachings of the present invention.
Figure 2:
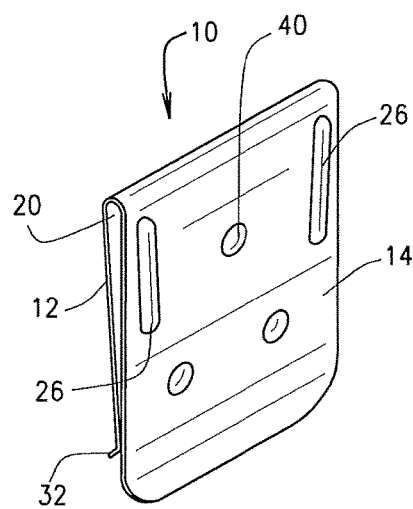
FIG. 2 is another perspective view of the clip holder of FIG. 1 constructed according to the teachings of the present invention.
Figure 5:
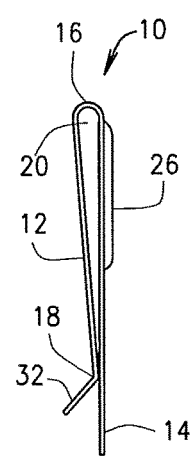
FIG. 5 is a side elevational view of the clip holder of FIGS. 1-4.
Figure 6:
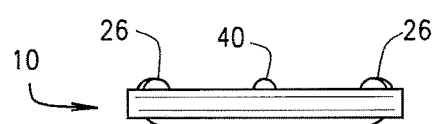
FIG. 6 is a top plan view of the clip holder of FIGS. 1-5.

Referring to the drawings more particularly by reference numbers wherein like numerals refer to like parts, FIGS. 1 and 2 illustrate one embodiment of the present clip holder 10 constructed in accordance with the teachings of the present invention, the clip holder 10 being selectively attachable to a user's pocket, belt, waistband, utility belt pouch, an appropriately sized piece of webbing or other garment portion as will be hereinafter further explained. The present clip holder 10 can be integrally formed from a relatively flat single piece of material, such as a spring steel type material or the like, which can be folded or bent upon itself to produce the clip holder 10 as illustrated in FIGS. 1 and 2. More particularly, the clip holder 10 includes an outer leg portion 12 and an inner leg portion 14 joined together by fold 16. Inner leg portion 14 is substantially vertical while outer leg portion 12 is angled inwardly towards inner leg portion 14 so as to mate with and touch leg portion 14 at mating surface 18 as best illustrated in FIG. 5. The fold 16 forms a space 20 between the outer and inner leg portions 12 and 14 thereby defining the thickness of the fold 16. The thickness of the fold 16 impacts the clamping force generated by the present clip holder 10 based upon the type of material used.

Figure 3:
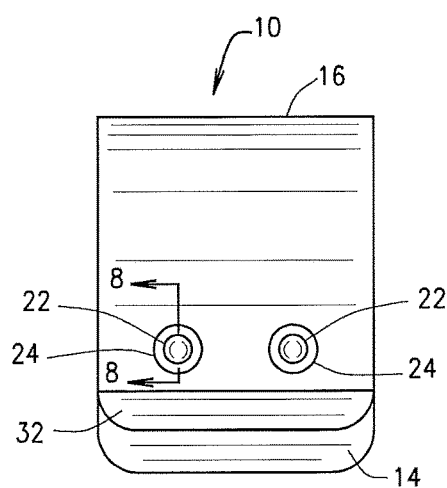
FIG. 3 is a front elevational view of the clip holder of FIG. 1.

The inner leg portion 14 includes at least one, and preferably a pair of dimples or projection members 22 which extend outwardly towards the outer leg portion 12 as best illustrated in FIGS. 1 and 3. A corresponding number of openings 24 are positioned and located on the outer leg portion 12 so as to receive the projection members 22 when the present clip holder 10 is in its unclamped or rest position as best illustrated in FIG. 5. The shape of the projection members 22 can be domed shaped, arcuate, or somewhat truncated as illustrated in FIG. 8 and their size and height should be such that each projection member 22 extends at least partially into its corresponding opening 24 as again illustrated in FIG. 8. The engagement and/or insertion of the projection members 22 into a corresponding opening 24 provides an improved gripping mechanism for holding the present clip member 10 on a particular garment material in that the projections 22 can push or otherwise force the fabric material associated with a pocket, belt or other garment portion into the corresponding openings 24 when the present clip member is inserted over that particular fabric portion. In this regard, the openings 24 are positioned so as to be substantially in alignment with the projections 22 as best illustrated in FIGS. 1, 3 and 8.

Regardless of its overall shape, each projection member 22 must project a sufficient distance into its corresponding opening 24 so as to sandwich the fabric material associated with a pocket, belt or other garment portion therebetween thereby securing the fabric member therebetween. This provides an improved gripping mechanism between the outer and inner leg portions 12 and 14 thereby preventing inadvertent movement or detachment of the present clip holder 10 from the pocket, belt or other garment portion to which it is attached.

Figure 4:
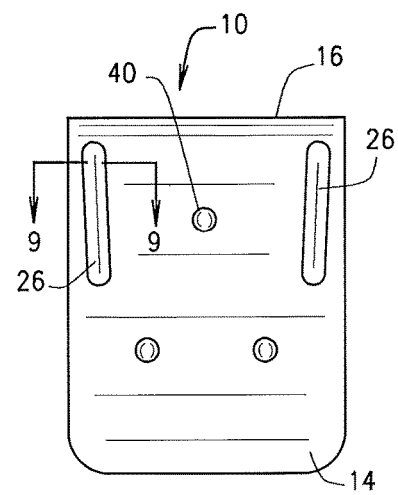
FIG. 4 is a rear elevational view of the clip holder of FIGS. 1 and 2.

As best illustrated in FIGS. 2, 4 and 9, the inner leg portion 14 includes a pair of elongated guide members 26 which are positioned and located so as to guide the spring clip 28 associated with a typical tape measure 30 as best illustrated in FIGS. 10 and 11 when it is inserted over the present clip holder 10 as will be hereinafter further explained. In this regard, a conventional tape measure such as tape measure 30 will include a retaining spring clip such as spring clip 28 (FIGS. 10 and 11) which is mounted to one side of the tape measure casing and is typically made of metal and shaped to provide a spring-like tension. The spring clip 28 typically includes a resiliently deflectable leg portion which is designed for insertion over a pocket, belt or other garment portion for attachment of the tape measure 30 directly to a user's clothing. As indicated above, direct attachment of the tape measure to a user's clothing does not provide sufficient attachment to the user's garment and is therefore subject to inadvertent movement and inadvertent detachment during normal activity of the user. Also, direct attachment and removal of the tape measure 30 onto and off of a user's clothing, over time, causes excessive wear and tear to the user's clothing.

The elongated guide members 26 are, in fact, elongated ribs or projections as best illustrated in FIG. 9 and they are strategically positioned and located on the inner leg portion 14 of the present holder 10 extending away from the outer leg portion 12 so as to guide the outer edges of a spring clip 28 associated with a tape measure 30 as the spring clip 28 is inserted over the fold 16 and push downwardly thereon as illustrated in FIGS. 10 and 11. The thickness of the fold 16 associated with the present clip holder 10 generates a stronger clamping force as the spring clip 28 is inserted thereover since the thickness of the fold 16 spreads the spring clip 28 further apart thereby generating a stronger clamping force. The elongated projections 26 can also be inclined inwardly towards each other as best illustrated in FIGS. 2, 4 and 7 so as to funnel the outer edges of the spring clip 28 towards the center of the inner leg portion 14 as the spring clip 28 is inserted onto the clip holder 10. Here again, the elongated projections 26 can likewise take on any particular cross-sectional shape such as an elongated rib or an elongated projection member as best illustrated in FIG. 9 so long as they project a sufficient distance away from inner leg portion 14 so as to capture and guide the outer edges of the spring clip 28 as it is pushed downwardly over clip holder 10.

FIGS. 10 and 11 illustrate use of the present clip holder 10 in association with a conventional tape measure 30 which eliminates many of the disadvantages and shortcomings associated with directly attaching the spring clip 28 of tape measure 30 to a user's clothing. Instead, the present clip holder 10 provides a layer of protection to the user's clothing or other garment portion and enables the spring clip 28 to be inserted over and directly attached to the present clip member 10 as illustrated in FIGS. 10 and 11. Inserting the spring clip 28 directly onto the present clip holder 10 provides for a secure attachment for the following reasons.

First of all, the clip holder 10, as previously explained, includes an improved gripping mechanism via projections 22 and openings 24 for securely attaching the present clip holder 10 to the fabric material associated with a pocket, belt, webbing or other garment portion. In addition, the thickness of the fold 16 associated with the present clip holder 10 likewise provides for an increased gripping force exerted by a spring clip member such as spring clip member 28 since the increased thickness of the fold 16 forces the tongue portion of the spring clip 28 further apart thereby generating a greater clamping force when the spring clip 28 is inserted over and onto the present clip holder 10. Use of the clip holder 10 also negates the wear and tear to a user's clothing if the spring clip 28 is directly attached to a user's clothing.

In addition, the elongated guide members 26 guide the clip member 28 as it is pushed downwardly onto clip holder 10 so as to center the spring clip 28 on the clip holder 10. In this regard, one end portion of the elongated projections 26 are located near or adjacent to the fold 16 so as to immediately capture and guide a spring clip 28 as it is inserted over the fold 16 and push downwardly onto the clip holder 10. The elongated projections 26 also serve to prevent lateral movement of the spring clip 28 associated with a typical tape measure or other tool as best illustrated in FIGS. 10 and 11. This further secures the tape measure 30 onto the present clip holder 10 and prevents inadvertent movement while so engaged.

The outer leg portion 12 of the present clip holder 10 likewise includes a flared flange or tongue portion 32 which allows a user to easily grasp the present clip holder 10 by the flared flange member 32 for both inserting the present clip holder 10 onto a pocket or other garment portion, and for easily removing the present clip member 10 from a pocket or other garment portion.

The inner leg portion 14 of the present clip holder 10 may likewise optionally include an additional projection member 40 which is positioned and located at an intermediate position between the opposed guide members 26 so as to be received by the opening 42 (FIGS. 10 and 11) typically associated with the spring clip 28 on a conventional tape measure such as tape measure 30. This additional projection member 40 is positioned and located so as to be received by the opening 42 when the spring clip 28 is pushed downwardly over the present clip holder 10 as best illustrated in FIGS. 10 and 11. The projection member 40 helps to retain the spring clip 28 onto the present clip holder 10 since it projects outwardly a sufficient distance to engage the side edge portions of the opening 42 if the spring clip 28 is moved or dislodged from its engaged position with clip holder 10. In such a case, the projection member 40 will engage the side edge portions of the opening 42 and help retain the spring clip 28 associated with a conventional tape measure such as tape measure 30 on the present clip holder 10. Any number of projection members 40 can be utilized in this capacity so long as all such projection members are received within the opening 42. The size and shape of the projection member 42 can be similar to projection members 22, or they can take on any size, shape and/or configuration so long as they can be received within the opening 42 and can engage the side edges of the opening 42 if dislodgement occurs. Again, projection member 40 is optional and may be included as a feature of the present clip holder 10.

FIG. 7 illustrates one method for fabricating the present clip holder 10. The present device 10 can be integrally formed from a single piece of flexible durable material 34 such as a resiliently deflectable spring steel material or a flat steel spring type material or the like wherein the dimples or projections 22, the corresponding openings 24, the elongated guide members 26, and the optional projection member 40 can be formed directly onto the flat single piece of material 34. In addition, the flared flange 32 can likewise be formed at one end portion of the single piece of sheet material 34 in a conventional manner by folding the flange 32 about fold line 36. Once the elements 22, 24, 26, and optional element 40 have been formed onto blank member 34, member 34 can be folded about fold line 38 so as to form the fold 16 illustrated in FIGS. 1,2 and 5. Bending the blank member 34 about fold line 38 can be achieved using conventional techniques so as to provide the desired space 20 between the outer and inner leg portions 12 and 14 as desired. Although using a single blank member 34 for forming the present clip holder 10 is advantageous, it is also recognized and anticipated that other methods and procedures for forming the clip holder 10 are likewise available, usable and envisioned. It is likewise recognized and anticipated that the overall length and thickness of the elongated guide members 26 can vary depending upon the size of the clip holder 10, and any number of dimples or projections 22 and openings 24 can likewise be utilized. In addition, any type of spring steel type material can be utilized so long as the material is flexible enough to be folded as illustrated in FIG. 7, or, if made in sections, the material produces a spring-like tension as described above. It is also recognized and anticipated that the overall size of the clip holder 10 can vary and it can be made so as to be compatible with a particular tape measure depending upon the size of the particular tape measure. The clip holder 10 can be longer, shorter, wider or narrower as illustrated in FIGS. 1-11 depending upon its particular application.

The various constructions described above and illustrated in the drawings are presented by way of example only and are not intended to limit the concepts and principles of the present invention. Thus, there has been shown and described a novel clip holder device for holding and supporting a tape measure or other tools having a spring-type clip associated therewith. As is evident from the foregoing description, certain aspects of the present invention are not limited by the particular details of the examples illustrated herein, and it is therefore contemplated that other modifications and applications, are equivalents thereof, will occur to those skilled in the art. The terms "having" and "including" and similar terms as used in the foregoing specification are used in the sense of "optional" or "may include" and not "as required". Many changes, modifications, variations and other uses and applications of the present constructions will, however, become apparent to those skilled in the art after considering the present specification and the accompanying drawings. All such changes, modifications, variations and other uses and applications which do not depart from the spirit and scope of the invention are deemed to be covered by the invention which is limited only by the claims which follow.

What is claimed is:

1. A clip holder for holding a tool having a spring type clip associated therewith comprising:
    an inner leg portion, an outer leg portion, and a fold formed between the inner and outer leg portions, the outer leg portion angling towards the inner leg portion;
    the inner leg portion including a pair of elongated guide members projecting away from the outer leg portion and positioned and located for guiding the spring type clip associated with a tool when inserted over the fold; and
    the inner leg portion further including at least one projection member projecting towards the outer leg portion.

2. The clip holder defined in claim 1 wherein the outer leg portion includes at least one opening for at least partially receiving the at least one projection member associated with said inner leg portion.

3. The clip holder defined in claim 1 wherein the clip holder is made from a single piece of material.

4. The clip holder defined in claim 1 wherein the tool is a tape measure.

5. The clip holder defined in claim 1 wherein the outer leg portion touches the inner leg portion.

6. The clip holder defined in claim 1 wherein the outer leg portion includes a flared flange.

7. The clip holder defined in claim 1 wherein the inner leg portion further includes at least one additional projection member positioned at an intermediate location between said pair of elongated guide members.

8. A clip holder for holding a tool having a spring type clip associated therewith comprising:
    an inner leg portion, an outer leg portion, and a fold formed between the inner and outer leg portions, the outer leg portion angling towards the inner leg portion;
    the inner leg portion including a pair of elongated guide members projecting away from the outer leg portion and positioned and located for guiding the spring type clip associated with a tool when inserted over the fold;
    the inner leg portion further including at least one projection member projecting towards the outer leg portion;
    said outer leg portion including at least one opening for at least partially receiving the at least one projection member associated with said inner leg portion.

9. The clip holder defined in claim 8 wherein said outer leg member further includes a flared flange.

10. The clip holder defined in claim 8 wherein the tool is a tape measure.

11. The clip holder defined in claim 8 wherein the outer leg portion touches the inner leg portion.

12. The clip holder defined in claim 8 wherein the clip holder is made from a single piece of material.

13. The clip holder defined in claim 8 wherein the inner leg portion further includes at least one additional projection member projecting away from the outer leg portion and positioned at an intermediate location between said pair of elongated guide members for being received by an opening associated with the spring type clip of the tool.

14. A clip holder for holding a tape measure having a spring type clip associated therewith, the clip holder comprising:
    an inner leg portion, an outer leg portion, and a fold formed between the inner and outer leg portions, the outer leg portion angling towards the inner leg portion;
    the inner leg portion including a pair of elongated guide members projecting away from the outer leg portion and positioned and located for guiding the spring type clip associated with the tape measure when inserted over the fold;
    the inner leg portion further including at least a pair of projection members projecting towards the outer leg portion;
    said outer leg portion including at least a pair of openings for at least partially receiving the at least pair of projection members associated with said inner leg portion; and
    the outer leg portion further including a flared flange.

15. The clip holder defined in claim 14 wherein the clip holder is made from a single piece of material.

16. The clip holder defined in claim 14 wherein the outer leg portion touches the inner leg portion.

17. The clip holder defined in claim 14 wherein said pair of elongated guide members are inclined towards each other.

18. The clip member defined in claim 14 wherein the inner leg portion further includes an additional projection member projecting away from the outer leg portion and positioned at an intermediate location between said pair of elongated guide members for being inserted into an opening formed in the spring type clip of the tape measure.

* * * * *